United States Patent
Kulkarni et al.

(10) Patent No.: US 7,476,636 B2
(45) Date of Patent: *Jan. 13, 2009

(54) METHOD OF MAKING MIXED MATRIX MEMBRANES USING ELECTROSTATICALLY STABILIZED SUSPENSIONS

(75) Inventors: Sudhir S. Kulkarni, Wilmington, DE (US); David J. Hasse, Bel Air, MD (US); Dean W. Kratzer, Warwick, MD (US)

(73) Assignee: L'Air Liquide, Societe Anonyme A Directoire et Conseil de Surveillance pour l'Etude et l'Exploration des Procedes Georges Claude, Paris (FR)

( * ) Notice: Subject to any disclaimer, the term of this patent is extended or adjusted under 35 U.S.C. 154(b) by 629 days.

This patent is subject to a terminal disclaimer.

(21) Appl. No.: 11/091,619

(22) Filed: Mar. 28, 2005

(65) Prior Publication Data

US 2006/0117949 A1  Jun. 8, 2006

Related U.S. Application Data

(60) Provisional application No. 60/633,360, filed on Dec. 3, 2004.

(51) Int. Cl.
*B01J 27/06* (2006.01)
*B01J 20/28* (2006.01)
*B01J 31/00* (2006.01)
*B01D 53/22* (2006.01)

(52) U.S. Cl. .............. 502/60; 502/159; 502/4; 96/4; 96/10; 95/45; 264/41; 210/500.38; 210/500.27; 210/500.23

(58) Field of Classification Search ............. 502/60, 502/159, 4; 96/4, 10; 95/45; 264/41; 210/500.38, 210/500.27, 500.23
See application file for complete search history.

(56) References Cited

U.S. PATENT DOCUMENTS

| 4,544,538 | A * | 10/1985 | Zones ................ 423/706 |
| 5,085,676 | A * | 2/1992 | Ekiner et al. ............ 96/13 |
| 5,127,925 | A * | 7/1992 | Kulprathipanja et al. ........ 95/54 |
| 5,674,629 | A * | 10/1997 | Avrillon ............. 428/473.5 |
| 6,497,747 | B1 * | 12/2002 | Ding et al. ............. 95/45 |
| 6,626,980 | B2 * | 9/2003 | Hasse et al. ............ 95/51 |
| 7,018,445 | B2 * | 3/2006 | Simmons et al. .......... 95/51 |

* cited by examiner

*Primary Examiner*—Elizabeth D Wood
(74) *Attorney, Agent, or Firm*—Christopher J. Cronin

(57) ABSTRACT

Mixed matrix composite (MMC) membranes with minimal macrovoids and defects are provided by the current invention. MMC Membranes are needed that have minimal macrovoids and defects, provide consistent and good selectivity and permeability performance, provide the mechanical strength required to withstand high membrane differential pressures, and exhibit sufficient flexibility and can easily be formed into desirable membrane forms. MMC Membranes made from a spinning dope that is stabilized with an electrostabilizing additive, particularly an acid additive, results in membranes, particularly hollow fiber membranes that have minimal macrovoids and defects. Thus, membranes of the current invention are particularly suitable for high trans-membrane pressure applications, particularly for separating oxygen/nitrogen, hydrogen/hydrocarbon, and carbon dioxide/hydrocarbon components of a stream.

28 Claims, 1 Drawing Sheet

Current Invention

METHOD OF MAKING MIXED MATRIX MEMBRANES USING ELECTROSTATICALLY STABILIZED SUSPENSIONS

CROSS-REFERENCE

This application is related to and claims the benefit of U.S. Provisional Application No. 60/663,360, filed Dec. 3, 2004, titled, "Hollow Fiber Composite Mixed Matrix Membrane Spun with Electrostatically Stabilized Sieve Particles".

GOVERNMENT RIGHTS

The current invention was made with Government support provided by the terms of contract No. 70NAHBOH3051, awarded by the National Institute of Standards and Technology, thus the Government has certain rights in the invention.

BACKGROUND

This invention relates to mixed matrix gas separation membranes incorporating a molecular sieve material dispersed in a polymer.

The use of selectively gas permeable membranes to separate the components of gas mixtures is a commercially very important art. Such membranes are traditionally composed of a homogeneous, usually polymeric, composition through which the components to be separated from the mixture are able to travel at different rates under a given set of driving force conditions, e.g. transmembrane pressure, and concentration gradients.

A relatively recent advance in this field utilizes mixed matrix composite (MMC) membranes. Such membranes are characterized by a heterogeneous, active gas separation layer comprising a dispersed phase of discrete particles in a continuous phase of a polymeric material. The dispersed phase particles are microporous materials that have discriminating adsorbent properties for certain size molecules. Chemical compounds of suitable size can selectively migrate through the pores of the dispersed phase particles. In a gas separation involving a mixed matrix membrane, the dispersed phase material is selected to provide separation characteristics that improve the permeability and/or selectivity performance relative to that of an exclusively continuous phase polymeric material membrane.

U.S. Pat. Nos. 4,740,219, 5,127,925, 4,925,562, 4,925,459, 5,085,676, 6,508,860, 6,626,980, and 6,663,805, which are not admitted to be prior art with respect to the present invention by their mention in the background, disclose information relevant to mixed matrix composite membranes. U.S. Pat. Nos. 4,705,540, 4,717,393, and 4,880,442 and U.S. patent Publication Nos. 20040147796, 20040107830, and 20040147796, which are not admitted to be prior art with respect to the present invention by their mention in the background, disclose polymers relevant to permeable gas separation membranes. However, these references suffer from one or more of the disadvantages discussed herein.

Permselective membranes for fluid separation are used commercially in applications such as the production of oxygen-enriched air, production of nitrogen-enriched-air for inerting and blanketing, separation of carbon dioxide from methane or nitrogen for the upgrading of natural gas streams, and the separation of hydrogen from various petrochemical and oil refining streams. It is highly desirable to use membranes, such as MMC membranes, that exhibit high permeabilities, and good permselectivities in these applications.

MMC membranes that exhibit high permeabilities, and good permselectivities in some applications, especially hollow fiber applications, have proven problematic to the industry. Some MMC membranes suffer from poor performance due to problems dispersing the particulate molecular sieve material, particularly in polymers with low flexibility. Other MMC membrane processes use a high mass ratio of dispersed particles in the continuous phase, making the slurry difficult to process and increasing the brittleness of the membranes. Furthermore, some MMC membrane processes fail to teach how to prepare hollow fiber membranes using MMC suspensions. Some processes that do teach hollow fiber MMC membranes suffer from defects and macrovoids, which adversely affects attaining optimum selectivity as well as lowering the mechanical integrity of the fiber. Thus, many prior MMC membrane materials fail to provide a membrane with an optimum balance of high productivity and selectivity (particularly for the fluids of interest discussed above), and that are easily processed into a variety of membrane forms.

The fabrication of MMC hollow fiber membranes for gas separation modules is particularly problematic for the industry. Producing hollow fiber membranes typically involves extruding the nascent fiber through narrow channel extrusion dies, (spinnerettes) at very high shear rates. Such high shear conditions can impair microstructural stability of the heterogeneous composition and thus agglomerate and concentrate the particles so that a uniform dispersion is not maintained. The manufacture of MMC hollow fiber membranes also normally calls for axially drawing the nascent fibers to provide them with precise and uniform cross section dimensions. Drawing the nascent fibers as they emerge from the spinnerettes engenders stresses that can cause discontinuity at the interface between the dispersed phase particles and the continuous phase polymer within the mixed matrix. This contributes to the formation of macrovoids at the interface. Such macrovoids provide the gases migrating through the membrane the opportunity to bypass the active selective separation portions. Consequently, the desired high selectivity cannot be achieved. The formation of macrovoids also decreases the mechanical integrity and pressure capability of the MMC hollow fiber. Furthermore, the MMC selectivity enhancement effect can only be seen at low draw ratios/take-up speeds; unfortunately, macrovoid size and frequency increases as the draw ratio decreases.

It remains highly desirable to provide a MMC gas separation membrane having molecular sieve particles dispersed in a continuous polymer matrix that is macrovoid-free, can consistently yield a combination of higher flux and selectivity, and have sufficient flexibility to be processed on a commercial basis into a wide variety of membrane configurations, including hollow fiber membranes. It is also desirable that the membrane has sufficient strength to maintain structural integrity despite exposure to high transmembrane pressures.

SUMMARY

The present invention provides a method of making a MMC membrane, particularly a hollow fiber MMC membrane, with improved selectivity and good mechanical strength by electrostatically stabilizing molecular sieve particles in the spinning solution. Spinning dope formulations containing electrostabilizing additives, particularly organic acids, yield MMC membranes that exhibit better and more consistent selectivity, and improved mechanical strength over formulations without electrostabilizing additives. This method of fabricating the mixed matrix hollow fiber membrane is particularly suitable for producing hollow fiber MMC membranes under commercial industrial conditions.

The method of the current invention synthesizes a stabilized suspension containing a solvent, a polymer, a molecular sieve material comprising molecular sieve particles, and an electrostatically stabilizing additive ("electrostabilizing additive"). The electrostabilizing additive stabilizes the molecular sieve in the suspension, thus forming the stabilized suspension. The stabilized suspension is then used to form a membrane. Electrostabilizing additives can be any chemical which imparts the desired repulsive charge to the molecular sieve particles suspended in the concentrated polymer solution that forms the membrane. Preferred electrostabilizing additives include, but are not limited to acid additives, particularly citric acid, tolulene sulfonic acid, or mixtures of acids additives. The molecular sieve material can be any molecular sieve material known to one of ordinary skill in the art that is suitable for producing MMC membranes.

In other embodiments of the invention:
a) the absolute value of the Zeta potential of the stabilized suspension is 2 to 3 times greater than the absolute value of the Zeta potential of the concentrated suspension;
b) the stabilized suspension has a Zeta potential with an absolute value of at least about 25 mV;
c) the molecular sieve material is selected from the group consisting of aluminosilicate molecular sieve, silicalite molecular sieve, silico-alumino-phosphate molecular sieve, alumino-phosphate molecular sieve, carbon-based molecular sieve, and mixtures thereof;
d) the molecular sieve material is a chabazite type zeolite selected from the group consisting of aluminosilicate type SSZ-13, hydrogen-exchanged aluminosilicate type H-SSZ-13, sodium-exchanged aluminosilicate type Na-SSZ-13, silicoaluminophosphate type SAPO-34, silicoaluminophosphate type SAPO-44, and mixtures thereof;
e) the molecular sieve material is a SSZ-13 sieve material;
f) the polymer is a polyimide polymer or a polyetherimide polymer; and
g) the polymer is P84 polymer, P84-HT polymer, Matrimid 5218, Ultem 1000, or mixtures thereof.

MMC Hollow fiber membranes produced by this inventive method exhibit improved mechanical properties compared to fibers produced without the stabilizing additives. For example, one embodiment produces a fiber membrane with a maximum strain at break of at least about 60%. Furthermore, the hollow fibers of the current invention exhibit less tendency to contain macrovoids; typically comprising less than about 2 macrovoids/cross-section. Finally, the selectivity of hollow fiber membranes made by the current method exhibit more consistent performance. For example, one embodiment has a standard deviation for the selectivity of the fiber membranes of about 1.3 points or less.

Furthermore, this invention includes a method of separating one or more fluids from a fluid mixture comprising the steps of:
a) providing a fluid separation membrane of the current invention;
b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane, and a retentate fluid mixture depleted in the preferentially permeable fluid on the first side of the fluid separation membrane; and
c) withdrawing the permeate fluid mixture and the retentate fluid mixture separately.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
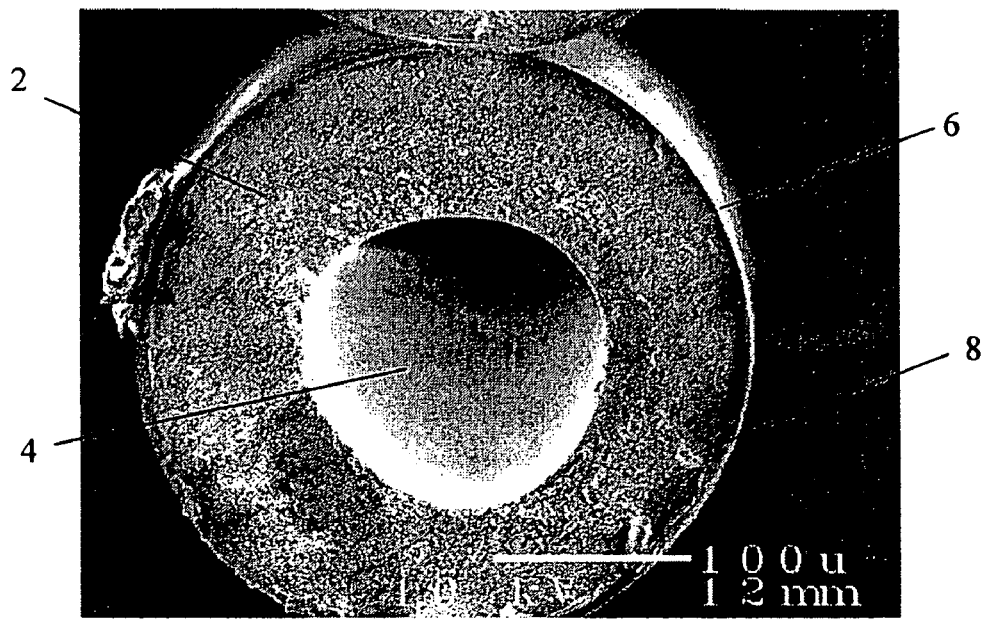
FIG. 1 shows the cross-section of a hollow fiber made according to the method of the current invention.

The method of the current invention produces a mixed matrix membrane by synthesizing a concentrated suspension containing a solvent(s), polymer, a molecular sieve material, and an electrostatically stabilizing additive ("electrostabilizing additive"). The electrostabilizing additive stabilizes the molecular sieve particles in the concentrated suspension, thus forming a stabilized suspension. The stabilized suspension is then used to form a membrane. Other components can be present in the polymer solution such as, processing aids, chemical and thermal stabilizers and the like, provided that they do not significantly adversely affect the separation performance of the membrane. Furthermore, the present invention includes a MMC membrane made by the method of the current invention, and a process of using the membrane for fluid separation.

As used in this application, "mixed matrix membrane" or "MMC membrane" refers to a membrane that has a selectively permeable layer that comprises a continuous phase of a polymeric material and discrete particles of adsorbent material dispersed throughout the continuous phase. These particles are collectively sometimes referred to herein as the "discrete phase" or the "dispersed phase". Thus the term "mixed matrix" is used here to designate the composite of discrete phase particles dispersed within the continuous phase.

In one embodiment of gas separation hollow fibers, the fiber is monolithic. By "monolithic" is meant that the whole of the fiber wall is a single element, sometimes referred to as a layer. The wall structure can be completely nonporous such that the entire wall thickness is selectively gas permeable. For many practical reasons, primarily that the flux associated with completely nonporous walled fibers is very low, asymmetric wall structure is preferred. Asymmetric walled hollow fibers are characterized by a thin, nonporous, selectively gas permeable skin at one surface of the fiber and a porous, less dense structure adjacent the skin. Usually, porosity increases and density decreases with radial distance from the skin. The skin is frequently on the outside of the fiber but alternatively can be on the inside. The thickness of the skin is usually less than about 1/10th of the wall thickness.

In one preferred embodiment, the hollow fiber has a multilayer structure comprising a porous substrate and a layer of selectively gas permeable composition adjacent to the substrate. This type of hollow fiber is referred to as a "composite" fiber. The substrate, also called the core, provides structural integrity for the selectively gas permeable layer (also called sheath) which is usually much thinner than the substrate. The pores of the substrate provide an unrestricted path for the permeating components of the gas mixture being separated and thus do not appreciably reduce transmembrane flux. The substrate is also frequently much less expensive than the selectively gas permeable material and accordingly, using a substrate reduces the cost of the membrane module without negatively affecting separation performance.

Figure 2:
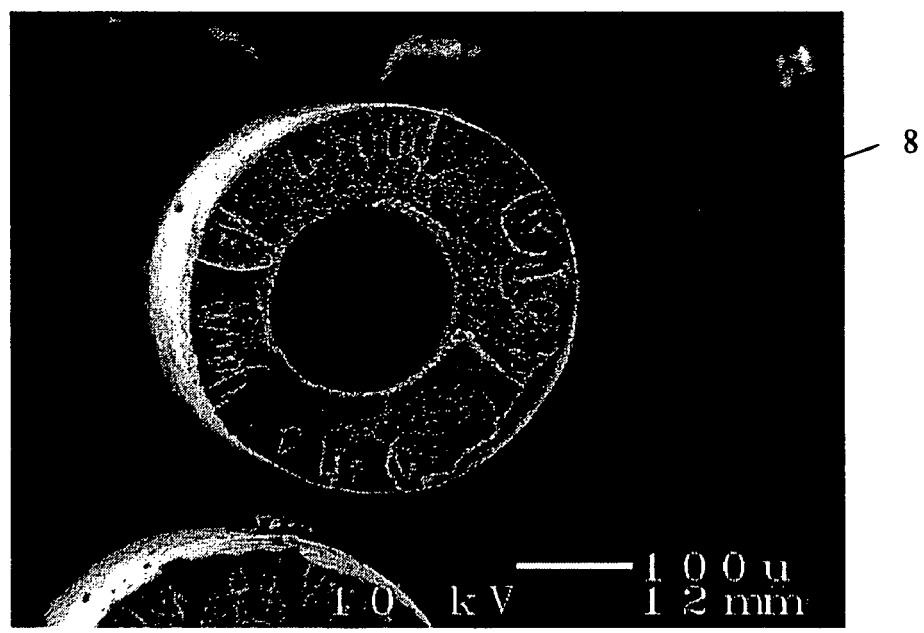
FIG. 2 shows the cross-section of a hollow fiber made according to a method of the prior art.

Good adhesion between polymer and zeolite particles in the separating layer is needed to see the enhanced selectivity of the MMC. An extreme example of a bypass path around the zeolite caused by poor adhesion is shown in FIG. 2. These bypass paths decrease selectivity by allowing gases to pass through the membrane without having to pass through the molecular sieve; consequently the MMC can at most exhibit the selectivity of the continuous phase polymer.

Poor adhesion can also allow a path for ingress of the non-solvent medium into the fiber as it is spun. This effect, which also results in macrovoids, can be seen even when the bypass pathways are small enough to be seen by scanning electron microscope (SEM). Referring to FIG. 1, as used in this application, "macrovoid" refers to voids or holes in the continuous phase polymer within the mixed matrix membrane. Macrovoids can occur in both monolithic and asymmetric fibers.

As used in this application, "P84" or "P84HT" refers to polyimide polymers sold under the tradenames P84 and P84HT respectively from HP Polymers GmbH.

As used in this application, "Ultem" or "Ultem 1000" refers to a thermoplastic polyetherimide polymer sold under the trademark Ultem®, manufactured by GE Plastics, and available from GE Polymerland.

As used in this application, "Matrimid" refers to a polyimide polymer sold under the trademark Matrimid® by Huntsman Advanced Materials. "Matrimid 5218" refers to a particular polyimide polymer sold under the trademark Matrimid®.

The current invention forms a fluid separation membrane by providing a polymer and a molecular sieve material; synthesizing a stabilized suspension comprising a solvent(s), the polymer, the molecular sieve material, and an electrostabilizing additive to form a stabilized suspension; and forming a membrane using the stabilized suspension.

The current invention synthesizes a stabilized suspension comprising a molecular sieve material, a solution of polymer and solvent(s), and an electrostabilizing additive. A conventional concentrated suspension can also be stabilized, thus forming a stabilized suspension, by incorporating an electrostabilizing additive in the concentrated suspension. Alternately, the electrostabilizing additive may be included with one of the components that forms the suspension, thus directly synthesizing a stabilized suspension. A stable suspension is one in which the solid particles tend to stay evenly dispersed and resists agglomeration or settling of the solids. Although not intended to be bound by a theoretical understanding of the effects of using an electrostabilizing additive, it is thought that the current invention imparts an electrostatic charge to the molecular sieve particles in the suspension. The suspension becomes stable due to mutual electrostatic repulsion of the molecular sieve particles.

The electrostatic charge of the suspension is represented by the "Zeta potential" of the suspension. Zeta potential is the electric potential that is estimated by measurements of the particle velocity in an applied direct-current electric field. Theory teaches that the zeta potential refers to the electric potential at the shear plane (slipping plane) of an imaginary surface separating the bound charges on the particle surface from the diffuse charges around it. When the absolute value of zeta potential is above 25 millivolts (mV) the suspensions of the current invention are typically stable due to mutual electrostatic repulsion. When the Zeta potential is close to zero, coagulation (agglomeration of particles) can be very fast. A comparison of the zeta potential for a standard concentrated suspension and a stabilized suspension (suspension containing an electrostabilizing additive) is shown in Table 1.

TABLE 1

Zeta potential change for suspended molecular sieve by adding electrostabilizing additive citric acid to an Ultem solution

|  | Formulation composition | Zeta potential, (mV) |
|---|---|---|
| Standard Suspension | 24% Ultem in NMP, 15% bop sized SSZ-13, 30% bop TMS | −13 |
| Stabilized Suspension | 23.7% Ultem in NMP, 15% bop sized SSZ-13, 30% bop TMS, 5.5% bop citric acid | −63 |

Sheath formulation nomenclature based on weights of components:
Polymer % = 100 × polymer/(NMP + polymer + additives)
Bop % additive = 100 × additive/polymer
Bop % zeolite = 100 × zeolite/polymer
SSZ-13 refers to zeolite that has been silanated with APDMS and sized with Ultem 1010 as taught in U.S. Pat. No. 6,626,980
Bop % means weight % based on contained polymer weight In preferred embodiments, the electrostabilizing additives increase the absolute value of the Zeta potential (referred to herein as "absolute Zeta potential") of the molecular sieve particles contained in the electrostabilized suspension to a range that result in a stable suspension. The electrostabilizing additives can be any chemical suitable for imparting a desired Zeta potential charge to the mixture. One embodiment increases the absolute Zeta potential of the molecular sieve particles in the electrostabilized suspension to a level that is 100% greater than that of molecular sieve particles in a non-stabilized suspension. Another preferred embodiment increases the absolute Zeta potential 200%. One preferred embodiment increases the absolute Zeta potential of the stabilized molecular sieve particles in the electrostabilized suspension to greater than 25 mV. Preferred electrostabilizing additives include, but are not limited to, acid additives, particularly citric acid, tolulene sulfonic acid, and mixtures thereof.

The continuous phase of the mixed matrix membrane consists essentially of a polymer. By "consists essentially of" it is meant that the continuous phase, in addition to polymeric material, may include non-polymer materials that do not materially affect the basic and novel properties of this invention. For example, the continuous phase can include preferably small proportions of additives and process aids, such as surfactant residue used to promote dispersion of the molecular sieve in the polymer during fabrication of the membrane.

Preferably the polymeric continuous phase surrounding the molecular sieve particles is nonporous and free of bypass paths around the particles. By "nonporous" it is meant that the continuous phase is substantially free of dispersed cavities or pores through which components of the gas mixture could migrate. Transmembrane flux of the migrating components through the polymeric continuous phase is driven primarily by molecular solution/diffusion mechanisms. Therefore, it is important that the polymer chosen for the continuous phase is permeable to the components to be separated from the gas mixture. Preferably, the polymer is selectively gas permeable to the components, meaning that gases to be separated from each other permeate the membrane at different rates. That is, a highly permeable gas will travel through the continuous phase faster than will a less permeable gas. The selectivity of a gas permeable polymer is the ratio of the permeabilities of the pure component gases. Hence, the greater the difference between transmembrane fluxes of individual components, the larger will be the selectivity of a particular polymer.

A diverse variety of polymers can be used for the continuous phase. Typical polymers suitable for the nonporous polymer of the continuous phase according to the invention include substituted or unsubstituted polymers and may be selected from polysiloxane, polycarbonates, silicone-containing polycarbonates, brominated polycarbonates, polysulfones, polyether sulfones, sulfonated polysulfones, sulfonated polyether sulfones, polyimides and aryl polyimides, polyether imides, polyketones, polyether ketones, polyamides including aryl polyamides, poly(esteramide-diisocyanate), polyamide/imides, polyolefins such as polyethylene, polypropylene, polybutylene, poly-4-methyl pentene, polyacetylenes, polytrimethysilylpropyne, fluorinated polymers such as those formed from tetrafluoroethylene and perfluorodioxoles, poly(styrenes), including styrene-containing copolymers such as acrylonitrile-styrene copolymers, styrene-butadiene copolymers and styrene-vinylbenzylhalide copolymers, cellulosic polymers, such as cellulose acetate-butyrate, cellulose propionate, ethyl cellulose, methyl cellulose, cellulose triacetate, and nitrocellulose, polyethers, poly(arylene oxides) such as poly(phenylene oxide) and poly(xylene oxide), polyurethanes, polyesters (including polyarylates), such as poly(ethylene terephthalate), and poly(phenylene terephthalate), poly(alkyl methacrylates), poly(acrylates), polysulfides, polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ketones), poly(vinyl ethers), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates), polyallyls, poly(benzobenzimidazole), polyhydrazides, polyoxadiazoles, polytriazoles: poly(benzimidazole), polycarbodiimides, polyphosphazines, and interpolymers, including block interpolymers containing repeating units from the above such as terpolymers of acrylonitrile-vinyl bromide-sodium salt of para-sulfophenylmethallyl ethers, and grafts and blends containing any of the foregoing. The polymer suitable for use in the continuous phase is intended to also encompass copolymers of two or more monomers utilized to obtain any of the homopolymers or copolymers named above. Typical substituents providing substituted polymers include halogens such as fluorine, chlorine and bromine, hydroxyl groups, lower alkyl groups, lower alkoxy groups, monocyclic aryl, lower acyl groups, and the like.

Some preferred polymers for the continuous phase include, but are not limited to, polysiloxane, polycarbonates, silicone-containing polycarbonates, brominated polycarbonates, polysulfones, polyether sulfones, sulfonated polysulfones, sulfonated polyether sulfones, polyimides, polyetherimides, polyketones, polyether ketones, polyamides, polyamide/imides, polyolefins such as poly-4-methyl pentene, polyacetylenes such as polytrimethysilylpropyne, and fluoropolymers including fluorinated polymers and copolymers of fluorinated monomers such as fluorinated olefins and fluorodioxoles, and cellulosic polymers, such as cellulose diacetate and cellulose triacetate. An example of a preferred polyetherimide is Ultem 1000.

Preferred polyimide polymers include, but are not limited to:

a) Type I polyimides and polyimide polymer blends as described in copending application Ser. No. 10/642,407, titled "Polyimide Blends for Gas Separation Membranes", filed Aug. 15, 2003, now U.S. Pat. No. 7,018,445, the entire disclosure of which is hereby incorporated by reference;

b) polyimide/polyimide-amide and polyimide/polyamide polymer blends as described in copending application Ser. No. 11/036,569, titled, "Novel Separation Membrane Made From Blends of Polyimide With Polyamide or Pollyimide-Amide Polymers", file Jan. 14, 2005, now U.S. Pat. No. 7,393,383, the entire disclosure of which is hereby incorporated by reference;

c) annealed polyimide polymers as described in copending application Ser. No. 11/070,041, titled, "Improved Separation Membrane by Controlled Annealing of Polyimide Polymers", filed Mar. 2, 2005, the entire disclosure of which is hereby incorporated by reference;

d) P84 and P84-HT polymers;

e) Matrimid 5218; and f) Ultem 1000.

Each molecular sieve to be used in the dispersed phase has particular separation characteristics of flux and selectivity with respect to the components of a given gas mixture. These characteristics are largely determined by such factors as the effective pore size and framework structure. The molecular sieve separation characteristics can be chosen to be different from those of the continuous phase polymer. Usually, the separation characteristics of the molecular sieve are selected so that overall separation performance through the mixed matrix membrane is enhanced relative to performance through a homogenous membrane of the continuous phase material. For example, a selectively gas permeable polymer might have a high flux but low selectivity in relation to a specific mixture of gases. A molecular sieve, having high selectivity for the same gases can be dispersed in the continuous phase of such polymer to produce a mixed matrix membrane having a superior combination of selectivity and flux.

The molecular sieve particle size should be small enough to provide a uniform dispersion of the particles in the suspension from which the mixed matrix membrane will be formed and also to obtain uniform distribution of the dispersed phase particles in the continuous phase of the mixed matrix membrane. The median particle size should be less than about 10 µm, preferably less than 3 µm, and more preferably less than 1 µm. Large agglomerates should be reduced to less than about 10 µm and preferably less than about 3 µm. Very fine molecular sieve particles may be made by various techniques such as by choosing appropriate synthesis conditions or by physical size reduction methods well known to those of ordinary skill in the art, such as ball milling, wet-milling and ultrasonication.

One preferred molecular sieve used in the mixed matrix membrane of the current invention is described in U.S. Pat. No. 6,626,980, which is fully incorporated herein by this reference. This type of molecular sieves is iso-structural with the mineral zeolite known as chabazite. That is, they are characterized by the chabazite framework structure designated as CHA by, *Atlas of Zeolite Structure Types*, W. M. Meier, D H Olson, and Ch. Baerlocher, Zeolites 1996, 17 (A1-A6), 1-230 (hereinafter "IZA"). This molecular sieve type derives its name from the structure of a naturally occurring mineral with the approximate unit cell formula $Ca_6Al_{12}Si_{24}O_{72}$. The chabazite type (CHA) molecular sieves are distinguished by channels based on 8-member rings with about 3.8 Å×3.8 Å (0.38 nm×0.38 nm) dimensions.

Illustrative examples of CHA type molecular sieves suitable for use in this invention include SSZ-13, H-SSZ-13, Na-SSZ-13, SAPO-34, and SAPO-44. SSZ-13 is an aluminosilicate molecular sieve material prepared as disclosed in U.S. Pat. No. 4,544,538, the entire disclosure of which is hereby incorporated by reference. Generally, SSZ-13 is a zeolite having a mole ratio of an oxide selected from silicon oxide, germanium oxide, and mixtures thereof to an oxide selected from aluminum oxide, gallium oxide, and mixtures thereof greater than about 5:1 and having the X-ray diffraction lines of Table 1 of U.S. Pat. No. 4,544,538. The zeolite further has a composition, as synthesized and in the anhydrous state, in terms of mole ratios of oxides as follows: (0.5 to 1.4) $R_2O$: (0 to 0.50) $M_2O$: $W_2O_3$: (greater than 5) $YO_2$ wherein M is an alkali metal cation, W is selected from aluminum, gallium, and mixtures thereof, Y is selected from silicon, germanium and mixtures thereof, and R is an organic cation. The organic R is removed typically by calcination at about 280-500° C. Thus, as used in this application, "calcinated SSZ-13" refers an SSZ-13 sieve material with organic R removed. SSZ-13 zeolites can have a $YO_2$:$W_2O_3$ mole ratio greater than about 5:1. As prepared, the silica:alumina mole ratio is typically in the range of 8:1 to about 50:1. Higher mole ratios can be obtained by varying the relative ratios of reactants. Higher mole ratios can also be obtained by treating the zeolite with chelating agents or acids to extract aluminum from the zeolite lattice. The silica:alumina mole ratio can also be increased by using silicon and carbon halides and similar compounds. Preferably, SSZ-13 is an aluminosilicate in which W is aluminum and Y is silicon.

It is sometimes desirable to remove the alkali metal cation from SSZ-13 and to replace it with hydrogen, ammonium or other desired metal ion. Ion exchange can occur after the organic moiety R is removed, usually by calcination. The hydrogen and sodium forms of SSZ-13, referred to herein respectively as H-SSZ-13 and Na-SSZ-13, are two preferred CHA molecular sieves for use in this invention. H-SSZ-13 is formed from SSZ-13 by hydrogen exchange or preferably by ammonium exchange followed by heating to about 280-400° C. A sample of H-SSZ-13 was found to have an Si/Al ratio of about 20-24 and Na/Al ratio of less than about 0.3 by electron spectroscopy chemical application ("ESCA") analysis or by inductively coupled plasma ("ICP") analysis.

The description and method of preparation of the silicoaluminophosphate and aluminophosphate molecular sieves SAPO-34 and SAPO-44 are found in U.S. Pat. No. 4,440,871, which is hereby incorporated herein by reference. The structure of these molecular sieves is reported by Ashtekar et al., (Journal of Physical Chemistry, V98, N18, May 5, 1994, p. 4878) to be that of the CHA type. SAPO-34 is also identified as having a CHA type structure in the Journal of the American Chemical Society, 106, p. 6092-93 (1984).

In one aspect of this invention, the molecular sieve can be bonded to the continuous phase polymer. The bond provides better adhesion and an interface substantially free of gaps between the molecular sieve particles and the polymer. Absence of gaps at the interface prevents mobile species migrating through the membrane from bypassing the molecular sieves or the polymer. This assures maximum selectivity and consistent performance among different samples of the same molecular sieve/polymer composition.

Bonding of the molecular sieve to the polymer utilizes a suitable binder such as a silane. Any material that effectively bonds the polymer to the surface of the molecular sieve should be suitable as a binder provided the material does not block or hinder migrating species from entering or leaving the pores. Preferably, the binder is reactive with both the molecular sieve and the polymer. The molecular sieve can be pretreated with the binder prior to mixing with the polymer, for example, by contacting the molecular sieve with a solution of a binder dissolved in an appropriate solvent. This step is sometimes referred to as "silanation" of the molecular sieves. Such silanation typically involves heating and holding the molecular sieve dispersed in the binder solution for a duration effective to react the binder with silanol groups on the molecular sieve. In addition, by suitable choice of the reactive functional groups on the binder, the silanated sieve can be further reacted with the polymer. This additional step is referred to here as "sizing". Silanation and sizing are disclosed in U.S. Pat. No. 6,626,980, the entire disclosure of which is hereby incorporated by reference.

Monofunctional organosilicon compounds disclosed in U.S. Pat. No. 6,508,860, the entire disclosure of which is hereby incorporated by reference, are one group of preferred binders. Representative of such monofunctional organosilicon compounds are 3-aminopropyl dimethylethoxy silane (APDMS), 3-isocyanatopropyl dimethylchlorosilane (ICDMS), 3-aminopropyl diisopropylethoxy silane (ADIPS), and mixtures thereof. Thus, as used in this application, "silanated SSZ-13" refers to a SSZ-13 sieve material that is pretreated as described above with a monofunctional organosilicon compound as a binder.

In another aspect of the invention, a molecular sieve material that has been pretreated by a washing method is used. The washing method generally includes treatment by such methods as soaking, steaming, and acidifying prior to adding the molecular sieve material to the suspension. Tests have shown that using washed sieve material provides a surprising improvement in both the permeability and selectivity of MMC membranes. Washed molecular sieve material is commercially available from some molecular sieve material suppliers, such as Chevron Research & Technology Company. Thus, as used in this application, "washed SSZ-13" refers to a SSZ-13 sieve material that has been treated by a washing method.

The mixed matrix membrane of this invention is formed by uniformly dispersing molecular sieve particles in the continuous phase polymer. This can be accomplished by dissolving the polymer in a suitable solvent and then adding the molecular sieve, either directly as dry particulates or as a slurry to the liquid polymer solution to form a concentrated suspension. The slurry medium can be a solvent for the polymer that is either the same or different from that used in polymer solution. If the slurry medium is not a solvent for the polymer, it should be compatible (i.e., miscible) with the polymer solution solvent and it should be added in a sufficiently small amount that will not cause the polymer to precipitate from solution. Agitation and heat may be applied to dissolve the polymer more rapidly or to increase the solubility of the polymer in the solvent. The temperature of the polymer solvent should not be raised so high that the polymer or molecular sieve, are adversely affected. Preferably, solvent temperature during the dissolving step should be about 25-100° C. The electrostabilizing additive is typically added to the concentrated suspension while the suspension is agitated to form a stabilized suspension.

The polymer solution should be agitated during and after addition of the molecular sieve material and electrostabilizing additive to form a uniform suspension of the molecular sieve particles in the polymer solution. Also, the molecular sieve slurry should be agitated to maintain a substantially uniform dispersion prior to mixing the slurry with the polymer solution. Agitation called for by this process can employ any conventional high shear rate unit operation such as ultrasonic mixing, ball milling, mechanical stirring with an agitator and recirculating the solution or slurry at high flow through or around a containment vessel.

When a stabilized suspension with a uniform dispersion of molecular sieve particles in polymer solution has been prepared, the membrane structure can be formed by conventional techniques known to one of ordinary skill in the art. By way of example, the suspension can be sprayed, cast with a doctor knife, or a substrate can be dipped into the suspension. Typical solvent removal techniques include ventilating the atmosphere above the forming membrane with a diluent gas and drawing a vacuum. Another solvent removal technique calls for immersing the dispersion in a non-solvent for the polymer that is miscible with the solvent of the polymer solution. Optionally, the atmosphere or non-solvent into which the dispersion is immersed and/or the substrate can be heated to facilitate removal of the solvent. When the membrane is substantially free of solvent, it can be detached from the substrate to form a self supporting structure or the membrane can be left in contact with a supportive substrate to form an integral composite assembly. In such a composite, preferably the substrate is porous or permeable to gaseous components that the membrane is intended to separate. Further optional fabrication steps include washing the membrane in a bath of an appropriate liquid to extract residual solvent and other foreign matter from the membrane and drying the washed membrane to remove residual liquid.

Referring to FIG. 1, one preferred embodiment of the current invention forms a mixed matrix hollow fiber membrane 2 for gas separation comprising an inner bore 4 of an inside diameter ("ID") and an outer surface 6 of an outside diameter ("OD"). Methods of forming hollow fiber membranes are known by one of ordinary skill in the art. One preferred method of making mixed matrix membranes is described in detail in U.S. Pat. No. 6,663,805, the entire disclosure of which is hereby incorporated by reference. The method of '805 feeds 1) a bore fluid solution comprised of a solvent for the polymer and water, 2) a core polymer solution comprised of polymer, solvent and processing aids, and 3) a sheath polymer suspension comprised of polymer, solvent, and molecular sieve particles through a concentric annular spinnerette to form nascent composite MMC hollow fibers comprising a selectively gas permeable MMC polymer layer coated on a supporting core layer, and immersing the nascent hollow fiber in a coagulant for a duration effective to solidify fiber, thereby forming a composite MMC hollow fiber membrane.

The extrusion of the nascent fiber through narrow channel extrusion channels of the spinnerette occurs at very high shear rates. Such high shear conditions can impair microstructural stability of the composition and thus agglomerate and concentrate the particles so that a uniform dispersion is not maintained. The manufacture of mixed matrix hollow fibers also normally calls for axially drawing the nascent fibers to provide them with precise and uniform cross section dimensions. Drawing the nascent fibers as they emerge from the spinnerettes engenders stresses that can cause discontinuity at the interface between the dispersed phase particles and the continuous phase polymer within the mixed matrix. Consequently, the desired high selectivity cannot be achieved. As taught in U.S. Pat. No. 6,663,805, it is necessary to spin the fiber at low draw ratios so as to avoid these stresses that create the bypass pathways that decrease MMC selectivity.

The MMC selectivity enhancement effect for non-stabilized suspensions can only be seen at low draw ratios/take-up speeds; unfortunately, macrovoid size/frequency increases as the draw ratio decreases. Macrovoids 8 are shown in FIGS. 1 & 2. In addition to hurting selectivity, the formation of macrovoids decreases the mechanical integrity of the mixed matrix fiber, leading to fiber collapse under high transmembrane pressures. Though many spinning parameters have been extensively studied, MMC fibers spun with the non-stabilized suspensions do not simultaneously show both a macrovoid-free cross-section as well as enhanced MMC selectivity.

Although not intended to be bound by a theoretical understanding of the effects of using stabilized suspensions for forming hollow fiber membranes, it is thought that the electrostatic forces imparted to the suspension by the current method maintains a uniform distribution of molecular sieve material in the stabilized suspension under high shear. Thus, the electrostabilization prevents agglomeration and concentration of the particles during the spinning process. The resulting hollow fiber membrane has minimum defects and macrovoids, and gives very reproducible separation performance.

The ratio of molecular sieve material to polymer in the membrane can be within a broad range. Enough continuous phase should be present to maintain the integrity of the mixed matrix composite. For this reason, the molecular sieve material usually constitutes at most about 100 weight parts of molecular sieve per 100 weight parts of polymer (or 100 wt. % molecular sieve, based on polymer, also referred to as "wt. % bop"). It is desirable to maintain the respective concentration of polymer in solution and molecular sieve particles in suspension at values which render these materials free flowing and manageable for forming the membrane. Preferably, the molecular sieve material in the membrane should be about 5 wt. % bop to about 50 wt. % bop, and more preferably about 10-30 wt. % bop.

The solvent utilized for dissolving the polymer to form the suspension medium and for dispersing the molecular sieve particles in suspension is chosen primarily for its ability to completely dissolve the polymer and for ease of solvent removal in the membrane formation steps. Additional considerations in the selection of solvent include low toxicity, low corrosive activity, low environmental hazard potential, availability and cost. Common organic solvents including most amide solvents that are typically used for the formation of polymeric membranes, such as N-methylpyrrolidone ("NMP"), N,N-dimethyl acetamide ("DMAC"), or highly polar solvents such as m-cresol. Representative solvents for use according to this invention also include tetramethylenesulfone ("TMS"), dioxane, toluene, acetone, and mixtures thereof.

One aspect of the invention, is a membrane formed by the method described above. One preferred membrane form is a hollow fiber membrane. In one preferred hollow fiber membrane, the electrostabilizing additive used to form the stabilized suspension is either citric acid, tolulene sulfonic acid, or mixtures thereof. One preferred hollow fiber membrane has a maximum strain of at least about 60%. Furthermore, one preferred hollow fiber membrane has less than about 2 macrovoids/cross-section. Even further, due to the stability of the spinning suspension of the current method, the bore flow of the spinning process can be reduced to form a smaller, thicker hollow fiber membrane and thus give better transmembrane pressure capability. In the samples tested, the ratio of outside diameter to inside diameter ("OD/ID ratio") of hollow fibers was increased from the typical 1.85 to greater than about 2.0 and even further to about 2.2. This increase in OD/ID ratio was accomplished with no increase in the number of macrovoids in the fibers. That is, fibers with an OD/ID ratio of greater than 2.0 could be produced with 2.0 or less macrovoids/cross-section. Furthermore, the fibers with an increased OD/ID ratio of greater than 2.0 retained a $CO_2/N_2$ selectivity of greater than about 20.

Another membrane that can be formed with the stabilized suspension of the current inventive method comprises a washed molecular sieve material and a polymer. Preferred washed sieve materials include a washed Na-SSZ-13 molecular sieve material, a washed H-SSZ-13 molecular sieve material, or a mixture of the washed Na-SSZ-13 and washed H-SSZ-13 molecular sieve materials.

The current invention includes a method of separating one or more fluids from a fluid mixture comprising the steps of:
(a) providing a fluid separation membrane of the current invention;
(b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane, and a retentate fluid mixture depleted in the preferentially permeable fluid on the first side of the fluid separation membrane; and
(c) withdrawing the permeate fluid mixture and the retentate fluid mixture separately.

The novel MMC membranes of the current invention can operate under a wide range of conditions and thus are suitable for use in processing feed streams from a diverse range of sources. For example, hollow fiber membranes made by the current method can be used for processes where pressure gradient across said membrane is in a range of about 100 to about 2000 psi. One preferred embodiment is used for processes where pressure gradient across said membrane is in a range of about 400 to about 2000 psi. Due to the good permeability, selectivity, and high strength capabilities of hollow fiber membranes of the current invention, one preferred method uses a membrane of the current invention to separate a feedstream that comprises carbon dioxide and methane. Another membrane of the current invention separates a feedstream that comprises hydrogen and methane.

Furthermore, one preferred embodiment of the current invention is capable of withstanding a transmembrane pressure of 1500-2000 psi (10-13.8 MPa), such as seen in petrochemical operations, and up to 1500 psi in natural gas sweetening operations. Typical hollow-fiber membranes are susceptible to collapse under these conditions unless the walls of the hollow fiber are capable of withstanding the stress engendered by high pressure. Membranes of the current invention provide a MMC hollow fiber membrane with high mechanical strength properties, making it possible to operate at higher trans-membrane pressure applications.

This invention is particularly useful for separating hydrogen from methane and/or other hydrocarbons mixtures. Such mixtures are produced as process streams in oil refineries and petrochemical plants, for example. Alternatively, this invention is useful for removing carbon dioxide and other acid gases such as hydrogen sulfide from raw natural gas to produce natural gas of pipeline quality. In this method, the membrane may comprise a composite hollow fiber membrane that comprises a supporting core layer and a fluid-separating sheath layer.

The membranes of the current invention satisfy the need to have a molecular sieve material dispersed in a continuous polymer matrix that can yield a combination of higher flux and consistently higher selectivity. Furthermore, membranes of the current invention can be processed on a commercial basis into a wide variety of membrane configurations, including hollow fiber membranes, while maintaining a low level of macrovoids and defects. Furthermore, membranes of the invention can be made into membranes with superior mechanical properties, resulting in superior performance when exposed to high membrane differential pressures and high process temperatures. Still further, the selectivity performance of hollow fibers made from the stabilized suspension is very consistent, despite varying spinning conditions. Thus, the spinning window for making MMC fibers with electrostabilized suspension is broadened relative to non-stabilized suspensions. Thus, the membranes of the current invention provide separation performance, mechanical properties, and manufacturing flexibility that allows favorable commercial membrane products to be produced for applications that previously presented significant problems to the membrane industry.

EXAMPLES

This invention is now illustrated by examples of certain representative, non-limiting embodiments thereof.

A Control formulation was made with a composition, similar to that taught in U.S. Pat. No. 6,663,805, and spun as a composite fiber by the method taught in that patent. Electrostabilizing additives containing formulations with citric acid (CA) and toluene sulfonic acid (TSA) were also made as shown below. The SSZ-13 was APDMS silanated and Ultem 1010 sized for all three formulations. All three formulations were all spun into MMC fiber as taught in U.S. Pat. No. 6,663,805.

Control Formulation (a) 32.5 wt % Polymer (Ultem);
(b) 15 wt % bop Molecular sieve material (SSZ-13);
(c) 30 wt % bop TMS; and
(d) remaining balance solvent (NMP).
("bop" means based on polymer)

Example 1

Formulation (CA)

(a) 32.5% Polymer (Ultem);
(b) 15% bop Molecular sieve material (SSZ-13);
(c) 30% bop TMS;
(d) 6% bop CA; and
(e) remaining balance solvent (NMP).

Example 2

Formulation (TSA)

(a) 32.5% Polymer (Ultem);
(b) 15% bop Molecular sieve material (SSZ-13);
(c) 30% bop TMS;
(d) 6% bop TSA; and
(e) remaining balance solvent (NMP).

The spinning parameters and resulting permeability data for fibers produced from the Control formulation, Example 1 formulation, and Example 2 formulation are shown in Tables 2, 3, and 4 respectively. Based on previous spin results (as taught in U.S. Pat. No. 6,663,805), a high spinneret temperature (about 90° C.) was maintained, and the take-up rate was less than 50 m/min. The air spinning gaps are reported as multiples of 2.5 cm. The lab-spun fiber was solvent exchanged by sequential treatment with methanol followed by hexane solvent, and then dried in a vacuum oven. Single gas permeation tests were conducted at 50° C./100 psi pressure for all samples. Permeance is reported in GPU units ($10^{-6}$ cm$^3$/cm$^2$·sec·cm Hg), and selectivity is the ratio of single gas permeabilities.

TABLE 2

Control Formulation Membrane Performance

| Sample # | Draw Ratio | Bore/ Solution Ratio | Gap, x = 2.5 cm | Permeability, $CO_2$ PPU | Selectivity, $CO_2/N_2$ |
|---|---|---|---|---|---|
| 1 | 1.4 | 0.17 | 1× | 44.7 | 20 |
| 2 | 1.9 | 0.17 | 0.4× | 67.6 | 20.3 |
| 3 | 1.9 | 0.17 | 2× | 46.5 | 12.5 |
| 4 | 2.0 | 0.17 | 1× | 61.5 | 19.5 |
| 5 | 2.0 | 0.17 | 1× | 47.1 | 20.4 |
| 6 | 2.6 | 0.17 | 1× | 58.9 | 15.4 |
| 7 | 2.6 | 0.17 | 1× | 47.5 | 20.7 |
| 8 | 3.5 | 0.17 | 1× | 81 | 21.1 |
| 9 | 1.9 | 0.12 | 1× | 68.9 | 20.2 |
| AVG. | | | | 58.2 | 18.9 |
| STD. DEV. | | | | 12.7 | 2.9 |

GPU = Gas Permeation Unit
Quench Temperature = 16° C.

TABLE 3

Example 1 Formulation Membrane Performance

| Sample # | Quench Temp. | Draw Ratio | Bore/ solution Ratio | Gap, x = 2.5 cm | Permeability $CO_2$, GPU | Selectivity, $CO_2/N_2$ |
|---|---|---|---|---|---|---|
| 10 | 28 | 1.3 | 0.25 | 3× | 34 | 23 |
| 11 | 28 | 1.9 | 0.25 | 3× | 36 | 23.1 |
| 12 | 28 | 1.9 | 0.25 | 1× | 32 | 23.6 |
| 13 | 28 | 2.6 | 0.25 | 1× | 37 | 23.6 |
| 14 | 28 | 2.6 | 0.25 | 3× | 32 | 21.6 |
| 15 | 28 | 3.2 | 0.25 | 1× | 35 | 23.7 |
| 16 | 14 | 1.3 | 0.25 | 1× | 32 | 22.1 |
| 17 | 14 | 1.9 | 0.25 | 3× | 32 | 24 |
| 18 | 14 | 1.9 | 0.25 | 1× | 34 | 24.9 |
| 19 | 10 | 1.9 | 0.25 | 4× | 39.1 | 24 |
| 20 | 10 | 1.9 | 0.17 | 3× | 38.5 | 24.3 |
| 21 | 10 | 1.9 | 0.17 | 4× | 30.2 | 24.2 |
| 22 | 10 | 1.9 | 0.25 | 3× | 33.2 | 22.3 |
| 23 | 10 | 2.6 | 0.25 | 4× | 39.1 | 21.6 |
| 24 | 10 | 2.6 | 0.17 | 4× | 41.4 | 23.3 |
| 25 | 10 | 2.6 | 0.17 | 3× | 40.4 | 22.2 |
| 26 | 26 | 1.9 | 0.25 | 3× | 29.3 | 25.1 |
| 27 | 26 | 1.9 | 0.17 | 3× | 39.5 | 23 |
| 28 | 26 | 2.6 | 0.25 | 3× | 45 | 21.4 |
| 29 | 26 | 2.6 | 0.17 | 3× | 31.6 | 25.6 |
| AVG. | | | | | 35.6 | 23.3 |
| STD. DEV. | | | | | 4.2 | 1.2 |

Quench Temperature = 13° C.

TABLE 4

Example 2 Formulation Membrane Performance

| Sample # | Bath Temp., ° C. | Draw Ratio | Bore/ solution Ratio | Gap, x = 2.5 cm | Permeability $CO_2$, GPU | Selectivity, $CO_2/N_2$ |
|---|---|---|---|---|---|---|
| 30 | 13 | 1.9 | 0.18 | 3× | 50.2 | 24.4 |
| 31 | 13 | 1.9 | 0.18 | 4× | 52.7 | 22.8 |
| 32 | 13 | 2.6 | 0.18 | 4× | 39.4 | 22.8 |
| 33 | 13 | 2.6 | 0.18 | 3× | 53.9 | 24.1 |
| 34 | 13 | 2.6 | 0.25 | 3× | 53.4 | 23.6 |
| 35 | 13 | 2.6 | 0.25 | 4× | 53 | 25.1 |
| 36 | 13 | 1.9 | 0.25 | 4× | 53.2 | 24.3 |
| 37 | 13 | 1.9 | 0.25 | 3× | 52.7 | 24.9 |
| Avg. | | | | | 51.1 | 24 |
| Std. Dev. | | | | | 4.8 | 0.9 |

Quench temperature 13°

As can clearly be seen by comparing the results of Table 2 (membranes produced from non-stabilized formulation), Tables 3 & 4 (membranes produced from the stabilized formulations), the MMC membranes produced from formulations with electrostabilizing additives showed higher and more consistent $CO_2/N_2$ selectivity. The $CO_2/N_2$ selectivity measured for fibers made from the non-stabilized Control formulation averaged about 19, whereas the $CO_2/N_2$ selectivity measured for fibers made from the Example 1 formulation (CA stabilized) and Example 2 formulation (TSA stabilized) averaged about 23 and 24 respectively. Furthermore, the standard deviation of the selectivity for Examples 1 and 2 were 1.2 and 0.9 respectively, which compares favorably to the standard deviation of 2.9 for the Control. Also, the performance of hollow fibers made from the stabilized suspension provided more consistent selectivity, despite a broader range of spinning conditions. It is known in the art that the spinning window for making MMC fibers with traditional non-stabilized suspension is relatively narrow because virtually every parameter change that improves selectivity has an adverse impact on macrovoids and visa-versa. Thus, it is difficult to optimize the process for maximum membrane performance. With electrostabilized additive formulations, the spinning window for obtaining enhanced MMC selectivity with minimal macrovoids is broadened. Thus, cooler quench temperature (11° C., 22° C.) and longer gaps can be used to increase MMC selectivity without the penalty of increased macrovoids.

As taught in U.S. Pat. No. 6,663,805, lower draw ratios (defined as the ratio of fiber take-up velocity divided by the average extrusion velocity in the annular fiber channel) increase the MMC selectivity enhancement. However, with the Control formulation, low draw ratios also tend to increase the frequency of macrovoids. For both Example 1 and Example 2 formulations, the macrovoid frequency was diminished in comparison to the Control formulation. The macrovoid frequency comparison is summarized in Table 5.

TABLE 5

Macrovoid Frequency

| Spin | Take-up Speed | Bore flow composition, NMP/H2O | Macrovoids per Cross-section |
|---|---|---|---|
| Stabilized | 40 m/min | 82/18 | 0 |
| Example 1 or 2 | 30 m/min | 82/18 | 0-1 |
| Formulation | 20 m/min | 82/18 | 0-2 |
| Control Formulation | 20-40 m/min | 82/18 | 2-6 |
| Control Formulation | 20-40 m/min | 85/15 | 8-20 |

Hollow fiber membrane samples of Example 1 (CA stabilized) were also prepared with lower bore flows. This results in a smaller and thicker fiber, which is expected to give better pressure capability (theoretically a function of OD/ID ratio). The OD/ID ratio on these samples was increased from about 1.85 to about 2.2 by reducing the bore flows. This approach when tried with non-stabilized Control formulations results in an even worse macrovoid situation (4-10 macrovoids/cross-section). With the Example 1 formulation, the macrovoids did not increase for the larger OD/ID ratio samples.

Spinning fibers with the electrostabilized additive in the spinning formulation also improves mechanical strength properties of the fiber. Table 6 shows the averaged Instron fiber strength test results for MMC fiber spun at 30 m/min with the Control formulation and Example 2 formulation (TSA stabilized).

TABLE 6

|  | Modulus, ksi | Yield strain, % | Yield stress, ksi | Toughness, ksi | Break strain, % |
| --- | --- | --- | --- | --- | --- |
| Control Formulation | 118 | 4.6 | 3.2 | 1.3 | 38 |
| Example 2 Formulation | 103 | 5.6 | 3.4 | 3.1 | 82 | ksi = thousands of pounds per square inch

Although the present invention has been described in considerable detail with reference to certain preferred versions and examples thereof, other versions are possible. For instance, membranes of sheet configuration can be produced rather than hollow fiber membranes. In addition, although SSZ-13 sieve material was the subject of the example, any suitable sieve material may be substituted in the method. Furthermore, a wide variety of polymers may be used with the current invention. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of producing a fluid separation membrane, said method comprising the steps of:
   a) providing a polymer and a molecular sieve material, wherein said molecular sieve material comprises molecular sieve particles;
   b) synthesizing a stabilized suspension, wherein said stabilized suspension comprises a solvent, said polymer, said molecular sieve material, and an electrostabilizing additive; and
   c) forming a membrane.

2. The method of claim 1, wherein said molecular sieve particles in said stabilized suspension have an absolute Zeta potential that is at least about 100% greater than said absolute Zeta potential of molecular sieve particles in a concentrated suspension absent said electrostabilizing additive.

3. The method of claim 2, wherein said Zeta potential absolute value for said molecular sieve particles in said stabilized suspension is at least about 200% greater than said absolute Zeta potential of molecular sieve particles in a concentrated suspension absent said electrostabilizing additive.

4. The method of claim 1, wherein said molecular sieve particles in said stabilized suspension have an absolute Zeta potential of at least about 25 mV.

5. The method of claim 1, wherein said electrostabilizing additive is selected from the group consisting of citric acid, tolulene sulfonic acid, and mixtures thereof.

6. The method of claim 5, wherein said forming step forms a hollow fiber membrane.

7. The method of claim 6, wherein said molecular sieve material is selected from a group consisting of aluminosilicate molecular sieve, silicalite molecular sieve, silico-alumino-phosphate molecular sieve, alumino-phosphate molecular sieve, carbon-based molecular sieve, and mixtures thereof.

8. The method of claim 6, wherein said molecular sieve material is a chabazite type zeolite selected from the group consisting of aluminosilicate type SSZ-13, hydrogen-exchanged aluminosilicate type H-SSZ-13, sodium-exchanged aluminosilicate type Na-SSZ-13, silicoaluminophosphate type SAPO-34, silicoaluminophosphate type SAPO-44, and mixtures thereof.

9. The method of claim 6, wherein said molecular sieve material is a SSZ-13 sieve material.

10. The method of claim 9, wherein said SSZ-13 sieve material is selected from the group consisting of a calcinated SSZ-13 sieve material, a silanated SSZ-13 sieve material, a sized SSZ-13 sieve material, and mixtures thereof.

11. The method of claim 10, wherein said molecular sieve particles in said stabilized suspension have an absolute Zeta potential of at least about 25 mV.

12. The method of claim 1, wherein said polymer is a polyimide polymer.

13. The method of claim 1, wherein said polymer is a polyetherimide polymer.

14. The method of claim 1, wherein said molecular sieve material is a SSZ-13 sieve material.

15. The method of claim 14, wherein said molecular sieve particles in said stabilized suspension have an absolute Zeta potential of at least about 25 mV.

16. A membrane for fluid separation made by a method comprising the steps of:
   a) providing a polymer and a molecular sieve material;
   b) synthesizing a stabilized suspension, wherein said stabilized suspension comprises a solvent, said polymer, said molecular sieve material, and an electrostabilizing additive; and
   c) forming a membrane.

17. The membrane of claim 16, wherein said electrostabilizing additive is selected from the group consisting of citric acid, tolulene sulfonic acid, and mixtures thereof.

18. The membrane of claim 16, wherein said membrane is a hollow fiber membrane.

19. The membrane of claim 18, wherein said hollow fiber has a maximum strain at break of at least about 60%.

20. The membrane of claim 18, wherein said hollow fiber comprises less than about 2 macrovoids/cross-section.

21. The membrane of claim 18, wherein said hollow fiber has an OD/ID ratio of equal to or greater than about 2.0.

22. The membrane of claim 21, wherein a $CO_2/N_2$ selectivity is greater than about 20.

23. The membrane of claim 18, wherein said hollow fiber membrane:
   a) comprises less than about 2 macrovoids/cross-section; and
   b) has an OD/ID ratio of equal to or greater than about 2.0.

24. The membrane of claim 23, wherein a $CO_2/N_2$ selectivity is greater than about 20.

25. A method of separating a fluid from a fluid mixture comprising the steps of:
   a) providing the membrane made by the method of claim 1, wherein said membrane is a hollow fiber membrane;
   b) contacting a fluid mixture with a first side of said membrane thereby causing a preferentially permeable fluid of said fluid mixture to permeate said membrane faster than a less preferentially permeable fluid to form a permeate fluid mixture enriched in said preferentially permeable fluid on a second side of said membrane and a retentate fluid mixture depleted in said preferentially permeable fluid on said first side of said membrane; and
   c) withdrawing said permeate fluid mixture and said retentate fluid mixture separately, wherein the pressure gradient across said membrane is in a range of about 100 to about 2000 psi.

26. The method of claim 25, wherein said pressure gradient across said membrane is in the range of about 1000 to about 2000 psi.

27. The method of claim 26, wherein said fluid mixture comprises carbon dioxide and methane.

28. The method of claim 27, wherein said fluid mixture comprises oxygen and nitrogen.

* * * * *